United States Patent [19]
Takeda

[11] Patent Number: 6,037,946
[45] Date of Patent: Mar. 14, 2000

[54] IMAGE SYNTHESIS APPARATUS AND IMAGE SYNTHESIS METHOD

[75] Inventor: Masaki Takeda, Tokyo, Japan

[73] Assignee: Namco Ltd., Tokyo, Japan

[21] Appl. No.: 08/682,592

[22] PCT Filed: Nov. 30, 1995

[86] PCT No.: PCT/JP95/02443

§ 371 Date: Sep. 26, 1996

§ 102(e) Date: Sep. 26, 1996

[87] PCT Pub. No.: WO96/17325

PCT Pub. Date: Jun. 6, 1996

[30] Foreign Application Priority Data

Nov. 30, 1994 [JP] Japan ..................... 6-321520

[51] Int. Cl.[7] ............... G06T 15/40; G06F 15/00
[52] U.S. Cl. ............................. 345/422; 345/430
[58] Field of Search ................... 345/422, 501, 345/515, 517, 121, 433, 431, 430, 133, 131, 125, 507, 504, 426, 429, 519

[56] References Cited

U.S. PATENT DOCUMENTS

| | | | |
|---|---|---|---|
| 4,958,302 | 9/1990 | Fredrickson et al. | 364/521 |
| 5,129,059 | 7/1992 | Hannah | 395/166 |
| 5,299,298 | 3/1994 | Elmquist et al. | 395/121 |
| 5,509,110 | 4/1996 | Latham | 395/121 |
| 5,548,693 | 8/1996 | Shinya | 395/152 |
| 5,572,636 | 11/1996 | Sakuraba et al. | 395/130 |
| 5,579,455 | 11/1996 | Greene et al. | 395/122 |
| 5,590,249 | 12/1996 | Hanaoka | 395/122 |

FOREIGN PATENT DOCUMENTS

| | | |
|---|---|---|
| 2-171971 | 7/1990 | Japan . |
| 3-201082 | 9/1991 | Japan . |
| 3-255589 | 11/1991 | Japan . |
| 5-159071 | 6/1993 | Japan . |

OTHER PUBLICATIONS

Information Processing Society of Japan, Jyouhou–Shori, vol. 24, No. 4, Apr. 15, 1983, "Information Processing", pp. 538–547.

*Primary Examiner*—Stephen S. Hong
*Assistant Examiner*—Alford W. Kindred
*Attorney, Agent, or Firm*—Oliff & Berridge, PLC

[57] ABSTRACT

Drawing processing uses a main Z-buffer in which is stored depth information that expresses distance from a viewpoint, corresponding to each of pixels on a display screen. The main Z-buffer is divided into M×N regions, each formed of K×L pixels. A ZR-buffer stores a minimum value ZMINR and a maximum value ZMAXR of the depth information for the pixels within each of the regions. The minimum value of depth information for a polygon is ZMIN, and the maximum value thereof is ZMAX. The process of referencing depth information stored in the main Z-buffer and the process of drawing the polygon are omitted when ZMIN≧ZMAXR, and the process of drawing is performed for the polygon without referencing depth information stored in the main Z-buffer when ZMAX≦ZMINR.

10 Claims, 12 Drawing Sheets

CLOSE DISTANCE       FAR DISTANCE

FIG. 9A
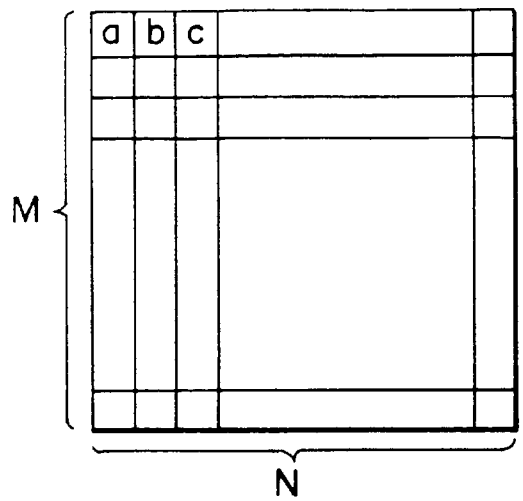
FIG. 9B
|a₁|a₂|a₃|a₄|b₁|b₂|b₃|b₄|c₁|c₂|c₃|c₄|
|a₅|a₆|a₇|a₈|b₅|b₆|b₇|b₈|c₅|c₆|c₇|c₈|
|a₉|a₁₀|a₁₁|a₁₂|b₉|b₁₀|b₁₁|b₁₂|c₉|c₁₀|c₁₁|c₁₂|
|a₁₃|a₁₄|a₁₅|a₁₆|b₁₃|b₁₄|b₁₅|b₁₆|c₁₃|c₁₄|c₁₅|c₁₆|
　　a　　　　b　　　　c
FIG. 9C
| COLUMN ROW | 1 | 2 | 3 | - - - - - - | 15 | 16 |
|---|---|---|---|---|---|---|
| FIRST ROW | a₁ | a₂ | a₃ |  | a₁₅ | a₁₆ |
| SECOND ROW | b₁ | b₂ | b₃ |  | b₁₅ | b₁₆ |
| THIRD ROW | c₁ | c₂ | c₃ |  | c₁₅ | c₁₆ |
FIG. 9D
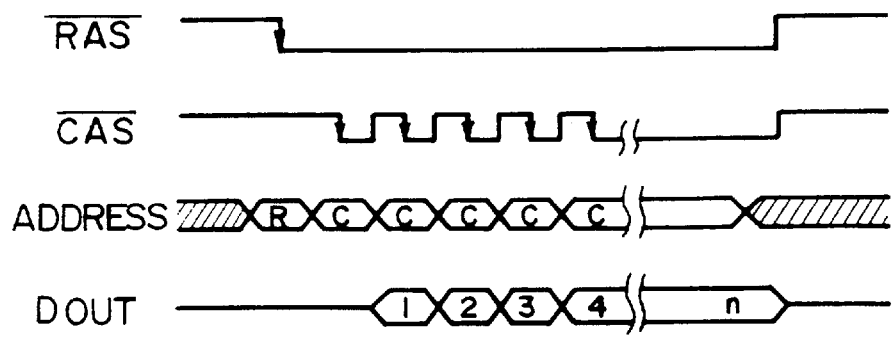

FAR DISTANCE

CLOSE DISTANCE

IMAGE SYNTHESIS APPARATUS AND IMAGE SYNTHESIS METHOD

TECHNICAL FIELD

This invention relates to an image synthesis apparatus and an image synthesis method that use a Z-buffer for drawing processing.

BACKGROUND OF ART

Various types of image synthesis apparatus for synthesizing three-dimentional (3D) images are known in the art. An example of the configuration thereof is shown in FIG. 11. This prior-art example comprises a control section 510, a virtual 3D space computation section 520, an image supply section 530, and an image synthesis section 540. The virtual 3D space computation section 520 performs computations for creating a virtual 3D space on the basis of control information that is input from the control section 510. The image supply section 530 performs computations such as coordinate transformation and clipping to create an image as seen from any predetermined viewpoint within the thus created virtual 3D space. In this case, each of the display objects configuring this virtual 3D space is configured by polygons, and the image supply section 530 outputs information (such as vertex coordinates) for each of these polygons to the image synthesis section 540. The image synthesis section 540 performs processing for drawing all the dots (pixels) within each polygon, from the thus input polygon information, making it possible to show an image on a display 512.

During this type of drawing processing, if a polygon is found to overlap another polygon, it is usually necessary to remove the portion thereof that is further away from the viewpoint (the hidden surface) and display only that portion that is closer to the viewer. A known prior-art method of removing such hidden surfaces is called the Z-buffer method. An example of this Z-buffer method was disclosed in *Jyouhou-Shori* (Information Processing) Vol. 24, No. 4 (published by the Information Processing Society, Apr. 15, 1983).

In the prior-art image synthesis apparatus that is intended to perform this hidden surface removal by the Z-buffer method, the image synthesis section 540 comprises a drawing processing section 542 and a Z-buffer 544. In this case, the Z-buffer 544 is a memory containing storage areas corresponding to each of the pixels on the screen, and each storage area contains a Z-value which is depth information that expresses distance from a viewpoint.

The Z-buffer method will now be described with reference to FIGS. 12A and 12B. In FIG. 12A, polygons P and Q of 3D objects 300 and 301 are perspectively transformed on a screen 306. The drawing processing is performed with the aid of the Z-buffer 544, in the sequence shown in FIG. 12B. A maximum value M (which is usually an infinite value) of the Z-values has been written into the Z-buffer 544 as an initial value. When the polygon P is drawn, for example, a decision is made as to whether or not the Z-value of each pixel of the polygon P is less than the Z-value of the corresponding pixel stored in the Z-buffer 544. If it is determined to be smaller, that pixel is subjected to drawing processing by the drawing processing section 542 and the Z-value of that pixel in the Z-buffer 544 is modified. More specifically, all of the corresponding Z-values are updated from M to P1 to P12.

Similarly, when the polygon Q is drawn, the Z-buffer 544 is referenced for each of the pixels to be drawn, and the drawing processing and updating of the Z-buffer 544 are performed in sequence in the same manner as described above. More specifically, the values P7, P8, P11, and P12 are updated to Q1, Q2; Q5, and Q6, and the M values for the remaining part of the polygon Q are updated to Q3, Q4, Q7, and Q8 to Q12. In other words, since the polygon Q is closer than the polygon P in this particular case, the overlapping portion thereof overwrites the Z-values to those of the polygon Q. The drawing processing section 542 uses the above method for the drawing processing of each polygon, and thus obtained image information is output through a frame buffer 546 and palette circuit 548 to the display 512.

This type of image synthesis apparatus is usually required to perform its processing in real-time, making it necessary to update the image data for one screen image (or, in some cases, two screen images) once every field, which could be once every 1/60 second. Thus this image synthesis apparatus is required to provide high-speed processing and the image quality will deteriorate if it cannot maintain this high speed. The part of this apparatus that is particularly important in regulating the speed of this image processing is the part thereof that performs the drawing processing for the pixels.

However, the prior-art Z-buffer method forces the apparatus to go through the entire procedure of referencing the Z-buffer 544, comparing the Z-value with the Z-value stored in the Z-buffer, and writing the result of this comparison back into the Z-buffer for each of the pixels during the drawing processing. This Z-buffer usually has a huge capacity and is provided as external memory for the drawing processing device. Therefore, time is required for accessing this memory, and thus drawing processing that has to access this external memory for each of the pixels will increase the overall processing time. In consequence, a limit has to be placed on the number of polygons that can be processed within one field, obstructing the provision of a high-quality image.

Since the Z-buffer for this prior-art Z-buffer method is external memory, physical limitations such as the numbers of output pins of the drawing processing device make it difficult to connect a plurality of drawing processing devices to a single Z-buffer to implement parallel processing.

A method of drawing processing in which cache memory is used to temporarily store part of contents of the Z-buffer is disclosed in Japanese Patent Application Laid-Open No. 3-255589. However, the drawing processing provided by this method still has to be performed while the depth information stored in the cache memory is referenced for each of the pixels, and thus the problem of a too-long drawing processing time inevitably remains.

Other methods of increasing speed are known, such as using page mode when DRAM is used as the Z-buffer. However, it has not been possible to up until now to enable the prior-art Z-buffer method to make full use of the characteristics of these methods of increasing the processing speed.

This invention was devised in order to solve the above described technical problems in the prior art. An objective thereof is to improve on the prior-art Z-buffer method by providing a ZR-buffer in addition to the Z-buffer (main Z-buffer), in order to increase the processing speed of drawing.

Another objective of this invention is to improve on the Z-buffer method to implement a drawing processing method that is suitable for parallel processing.

A further objective of this invention is to improve on the Z-buffer method to allow the application of techniques such as using cache memory or page mode.

DISCLOSURE OF INVENTION

In order to solve the above described problems in the prior art, an aspect of this invention relates to an image synthesis apparatus for referencing depth information from a main Z-buffer which stores depth information that expresses distance from a viewpoint for each of pixels on a display screen and for drawing a display object configured by polygons, comprising:

a ZR-buffer for storing a minimum value ZMINR and a maximum value ZMAXR of depth information for the pixels within each region of said main Z-buffer, where the main Z-buffer is divided into M×N regions each formed of K×L pixels; and drawing processing means for omitting a process of referencing depth information stored within the main Z-buffer and a process of drawing a polygon when ZMIN≧ZMAXR or ZMIN >ZMAXR, where a minimum value or a value less than the minimum value of depth information for pixels within the polygon is ZMIN and a maximum value or a value greater than the maximum value thereof is ZMAX, and for performing the process of drawing the polygon without referencing depth information stored within the main Z-buffer when ZMAX≦ZMINR or ZMAX<ZMINR.

In accordance with this aspect of the invention, the processes of referencing depth information from the main Z-buffer and drawing the polygons are omitted if ZMI≧ZMAXR. The process of drawing the polygons is performed without referencing depth information in the main Z-buffer if ZMAX≦ZMINR. Therefore, it is not necessary in these cases to access the large-capacity main Z-buffer, which helps to increase the processing speed. This tendency towards faster speeds is further increased if the main Z-buffer is provided as external memory and the ZR-buffer is provided as internal memory. If the size of a polygon is of the same order as the size of one region (block), the number of times reference processing is performed can be reduced to something like 2/(K×L) times that with the ordinary Z-buffer method. This invention also makes it possible to provide the ZR-buffer with a large number of ports, to enable parallel drawing processing.

Note that it is preferable with this aspect of the invention that a minimum value or a value less than the minimum value of depth information of pixels within a part of a polygon which is subdivided along border lines of the regions is set to be ZMIN, and a maximum value or a value greater than the maximum value thereof is set to be ZMAX.

Another aspect of this invention relates to an image synthesis apparatus for referencing depth information from a main Z-buffer which stores depth information that expresses distance from a viewpoint for each of pixels on a display screen and for performing drawing processing, comprising:

a ZR-buffer for storing a minimum value ZMINR and a maximum value ZMAXR of depth information for the pixels within each region of the main Z-buffer, where the main Z-buffer is divided into M×N regions each formed of K×L pixels; and drawing processing means for omitting a process of referencing depth information stored within the main Z-buffer and a process of drawing a pixel when ZPIX≧ZMAXR or ZPIX>ZMAXR, where depth information for the pixel to be drawn is ZPIX, and for performing the process of drawing the pixel without referencing depth information stored within the main Z-buffer when ZPIX≦ZMINR or ZPIX<ZMINR.

With this aspect of the invention, the processes of referencing depth information from the main Z-buffer and drawing the pixels are omitted if ZPIX≧ZMAXR. The process of drawing the pixels is performed without referencing depth information in the main Z-buffer if ZPIX≦ZMINR. Therefore, it is not necessary in these cases to access the large-capacity main Z-buffer, which helps to increase the processing speed. This tendency towards faster speeds is further increased if the main Z-buffer is provided as external memory and the ZR-buffer is provided as internal memory.

In yet another aspect of this invention, the apparatus further comprises a ZC-buffer for storing depth information for at least one of the regions of the main Z-buffer; wherein:

when depth information to be referenced is already stored in the ZC-buffer, the drawing processing means performs the process of drawing by referencing depth information stored in the ZC-buffer, without referencing depth information stored in the main Z-buffer.

With this aspect of the invention, depth information for at least one region (block) is stored in the ZC-buffer which acts as a cache memory. If the depth information to be referenced is already stored in the ZC-buffer, so that there is no need to reference the main Z-buffer, the drawing processing can be performed by referencing the small-capacity ZC-buffer. This helps to increase the processing speed. This tendency towards faster speeds is further increased if the main Z-buffer is provided as external memory and the ZC-buffer is provided as internal memory. In the same manner as with the ZR-buffer, a large number of ports can be attached to the ZC-buffer to enable parallel drawing processing. This configuration of the invention, in which depth information corresponding to at least one region in the ZR-buffer is stored in the ZC-buffer, has more advantages than a simple combination with memory having a cache function.

In a still further aspect of this invention, the main Z-buffer is configured of memory wherein a row address changes in synchronization with a column address strobe (CAS) signal and a column address changes in synchronization with a row address strobe (RAS) signal; and depth information for at least one region is stored in the memory as data at one row address.

With this aspect of the invention, the main Z-buffer is configured of memory that has a page mode function, so that the depth information for at least one region can be stored at a single row address in memory. The depth information can be referenced by controlling the CAS signal to change the column address. This aspect of the invention helps increase the speed of the processing by enabling the use of page mode, which is a method of accelerating memory access. This configuration of the invention, in which depth information corresponding to at least one region in the ZR-buffer is stored as data at a single row address in the main Z-buffer and a method such as page mode is used to increase speeds, has more advantages than a simple combination with memory having a page mode function.

Note that this invention can also be applied to a case in which depth information is set in such a manner that it decreases with increasing distance from the viewpoint, in which case the drawing processing means omits the process of referencing depth information stored in the main Z-buffer and the process of drawing when ZMAX≦ZMINR or ZMAX<ZMINR, or when ZPIX≦ZMINR or ZPIX<ZMINR, and performs the process of drawing without referencing depth information stored in the main Z-buffer when ZMIN≧ZMAXR or ZMIN>ZMAXR, or when ZPIX≧ZMAXR or ZPIX>ZMAXR.

BRIEF DESCRIPTION OF DRAWINGS

FIG. 9A to FIG. 9D are diagrams illustrative of a third embodiment of this invention;

BEST MODE FOR CARRYING OUT THE INVENTION

Preferred embodiments of this invention will be described below with reference to the accompanying drawings.

1. Principles of the Invention

Figure 1:
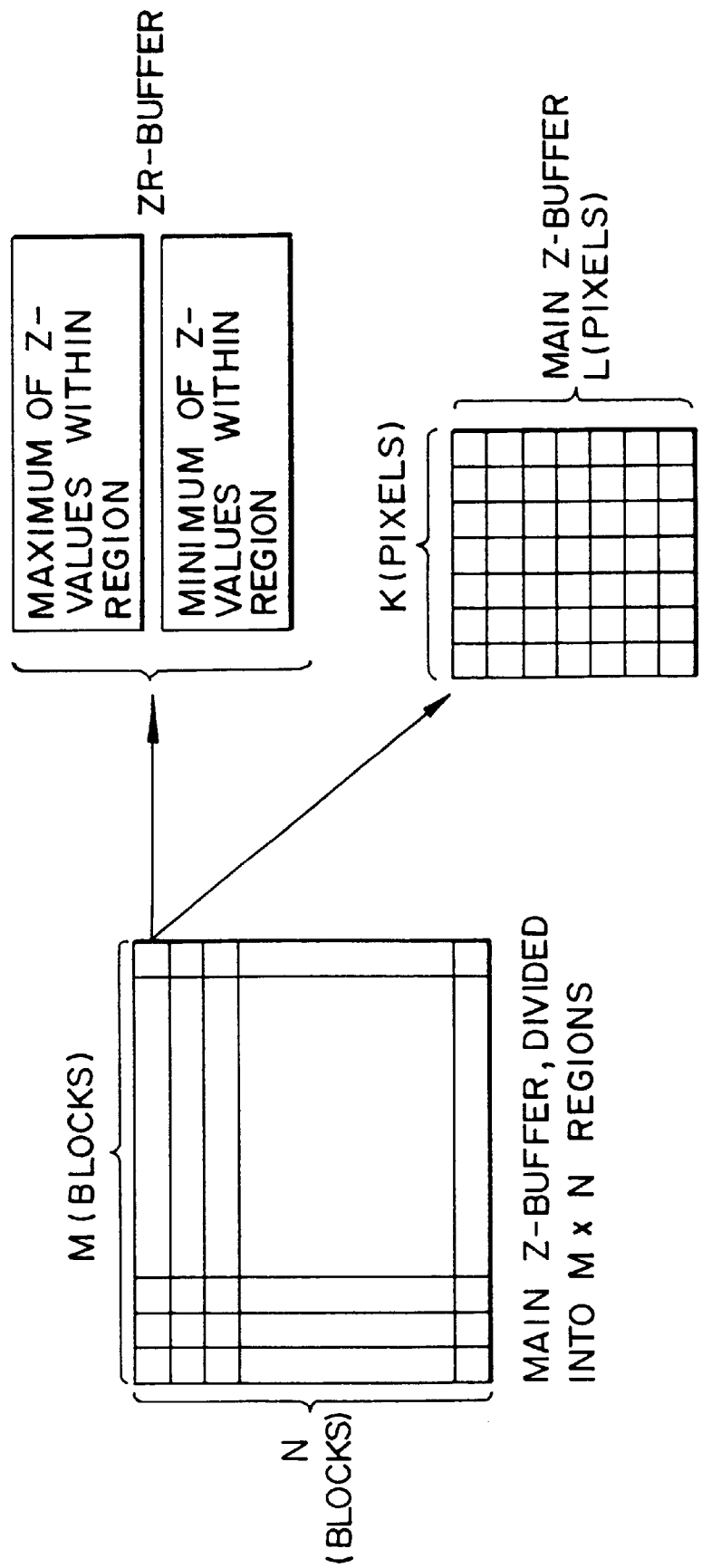
FIG. 1 is a diagram illustrative of the principle of this invention.

The principle of this invention will first be described. With this invention, a ZR-buffer is provided in addition to an ordinary Z-buffer (hereinafter called the "main Z-buffer") for storing Z-values that constitute depth information. The main Z-buffer in accordance with this invention is divided into M×N regions, where each region (block) consists of K×L pixels, as shown in FIG. 1. A minimum value and a maximum value of the Z-values within one region are stored in the ZR-buffer at a storage area corresponding to that region. In other words, the ZR-buffer has M×N storage areas, and a minimum value ZMINR and a maximum value ZMAXR of the Z-values of each region are stored in a corresponding storage area therein.

The description now turns to the drawing processing performed with the prior-art Z-buffer method. First of all, a Z-value (Z coordinate) ZP is computed for each of the pixels within a polygon. This value of ZP is then compared with a corresponding Z-value ZB in the main Z-buffer. If ZP is less than or equal to ZB, color and other information stored in a frame buffer and the Z-value stored in the main Z-buffer are updated for that pixel. It should be noted that the description below is based on the premise that Z-values are set to become smaller closer to the viewpoint. Of course, the generality of the principle of this invention is not invalidated by Z-values' that are set to become greater closer to the viewpoint.

In this invention, even if there is only one pixel in a region (a region as shown in FIG. 1), the following comparisons are performed. In other words, assume that a value supposed to be the minimum Z-value of a polygon is ZMIN, a value supposed to be the maximum Z-value of the polygon is ZMAX, the minimum Z-value in that region is ZMINR, and the maximum Z-value thereof is ZMAXR. In this case, the supposed minimum Z-value and the supposed maximum Z-value of a polygon need not necessarily be the actual minimum value ZMINT and actual maximum value ZMAXT of the Z-values of the polygon, so long as ZMIN≦ZMINT and ZMAX>ZMAXT. ZMINR and ZMAXR are the values that are currently stored in the ZR-buffer.

In accordance with this invention, ZMIN is compared with ZMAXR and ZMAX is compared with ZMINR. These comparisons may result in any one of the following three conditions:

(1) When ZMIN≧ZMAXR (or ZMIN>ZMAXR);
(2) When ZMAX≦ZMINR (or ZMAX<ZMINR);
(3) When neither condition (1) nor (2) is applicable.

Figure 2A:
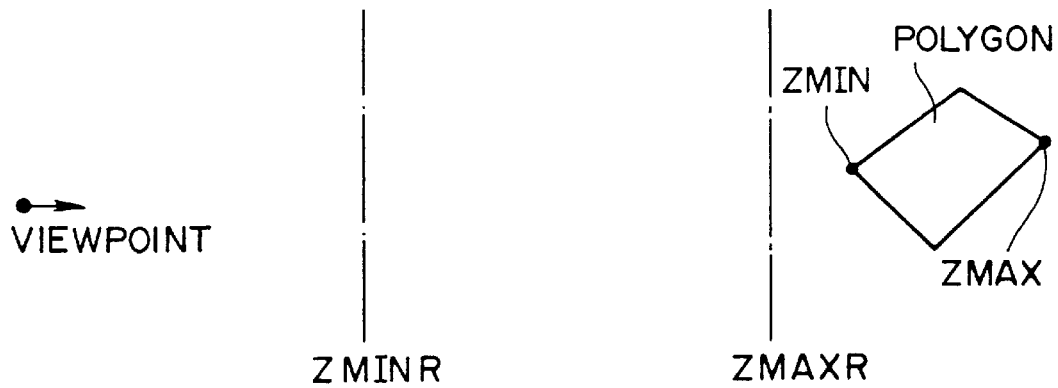
FIGS. 2A to 2C show the relationships between ZMIN, ZMAX, ZMINR, and ZMAXR.

Condition (1) means that the Z-values of all of the pixels within the polygon are equal to or greater than the maximum Z-value in that region, as shown in FIG. 2A. Therefore, it is determined that drawing processing is not necessary for any of the pixels within the polygon. In this case, the process of referencing the Z-values in the main Z-buffer (reading the Z-values and using them for comparison) and the process of drawing the polygon on the basis of the reference results are omitted.

Figure 2B:
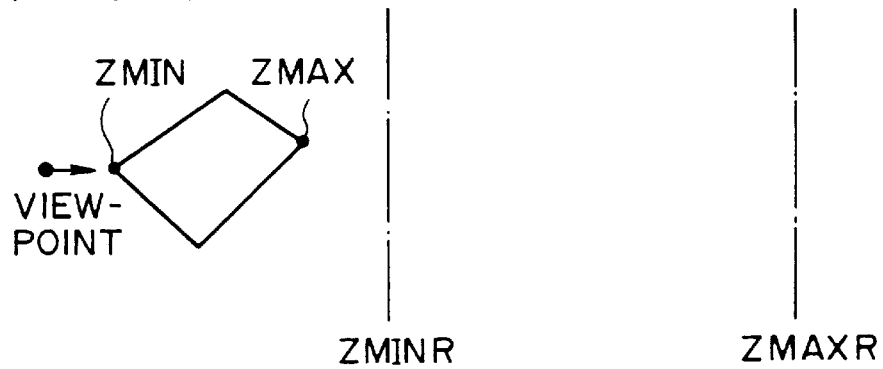

Condition (2) means that the Z-values of all of the pixels within the polygon are equal to or less than the minimum Z-value in that region, as shown in FIG. 2B. Therefore, it is determined that drawing processing is necessary for all of the pixels within the polygon. In this case, the polygon is subjected to drawing processing without referencing the Z-values in the main Z-buffer. The Z-values in the main Z-buffer and the minimum and maximum Z-values in the ZR-buffer are then updated for all of the pixels within the polygon.

Figure 2C:
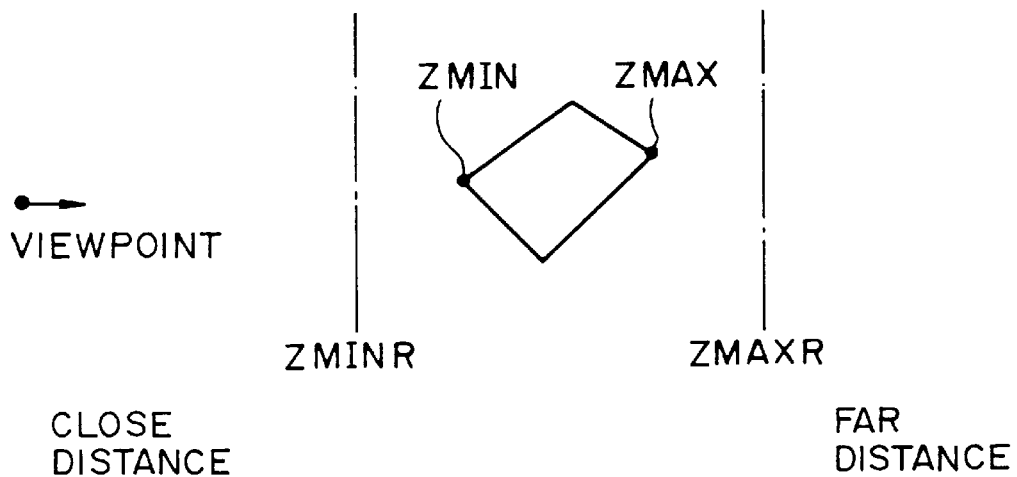

Condition (3) is shown in FIG. 2C. In this case, the Z-values in the main Z-buffer are referenced and the drawing processing is performed on the basis of the reference results, in the same manner as in the ordinary Z-buffer method. The Z-values in the main Z-buffer and the minimum and maximum Z-values in the ZR-buffer are then updated for those of the pixels that were subjected to the drawing processing.

Since the ZR-buffer stores only minimum and maximum values for each region, it can be configured of a small-capacity memory. Thus the ZR-buffer can be incorporated within the device (IC) that performs the referencing and other processing. As a result, if the ZR-buffer is provided with a large number of input/output ports that can be connected to reference processing means, it becomes possible to execute the above described reference processing in parallel. This will help increase the processing speed.

Note that the above description concerned drawing processing that is performed for each polygon. However, it should be obvious that the present invention is not limited thereto, and it can equally well be applied to other types of drawing processing such as one in which a scan-line algorithm is used for drawing individual pixels, irrespective of polygons. If the Z-value (depth information) of a pixel in such a case is assumed to be ZPIX, ZPIX is compared with ZMAXR and then with ZMINR. These comparisons may result in any one of the following three conditions:

(4) When ZPIX≧ZMAXR (or ZPIX>ZMAXR);
(5) When ZPIX≦ZMINR (or ZPIX<ZMINR);
(6) When neither condition (4) nor (5) is applicable.

With condition (4), it is determined that drawing processing is not necessary for that pixel and thus the processes of referencing the Z-value in the main Z-buffer and drawing the polygon on the basis of the reference results are omitted.

With condition (5), it is determined that drawing processing is necessary for that pixel and thus the pixel is subjected to drawing processing without referencing the Z-value in the main Z-buffer. The Z-value in the main Z-buffer and the minimum and maximum values in the ZR-buffer are then updated for that pixel.

With condition (6), the Z-value in the main Z-buffer is referenced and the drawing processing is performed on the basis of the reference result, in the same manner as in the ordinary Z-buffer method. The Z-value in the main Z-buffer and the minimum and maximum values in the ZR-buffer are then updated for that pixel.

When each polygon is processed, the ZR-buffer is referenced only once if condition (1) is applicable, and thus the drawing processing for all of the pixels within the polygon can be omitted. This means that the processing speed can be greatly increased. In contrast, the processing speed cannot be increased to such an extent if each pixel is processed. Even when each pixel is processed, however, there is no need to reference the main Z-buffer, which is implemented as a large-capacity external memory, and thus the processing speed can be increased by that factor, in comparison with the prior-art Z-buffer method.

The description now concerns the amount of increase drawing processing speed achieved by this invention.

With the prior-art Z-buffer method, the process of referencing a Z-value (reading and comparison processing) must be performed for each of the pixels that are to be drawn. Therefore, if it is assumed that a shape to be drawn (such as a polygon) is of substantially the same size as one region (K×L pixels), it is necessary to repeat the reference processing K×L times. In contrast, only two references to the ZR-buffer need be processed with the configuration of this invention if condition (1) or (2) (or (4) or (5)) is applicable. For example, if both K and L are equal to 16, K×L=256 references are necessary with the prior-art Z-buffer, but this invention reduces the quantity of processing by 2/(K×L)= 1/128. If condition (3) (or (6)) is applicable, the processing speed is the same as that with the prior-art Z-buffer, but this speed can be increased by combination with a suitable accelerator method. Two of the methods that can be considered therefor are:

(a) A method of increasing speed by storing part of the depth information from the main Z-buffer (the depth information for at least one region) in a high-speed cache memory (hereinafter called ZC-buffer);

(b) A method of increasing speed by storing the depth information for at least one region as data of a single row address in a main Z-buffer configured of DRAM or the like, and using high-speed page mode of DRAM or the like.

The actual increase in speed that can be expected in practice varies according to the values of K, L, M, and N, and the drawing situation. The states of each of conditions (1) and (2) (or (4) and (5)) can be expected to produce huge increases in speed, but the state of condition (3) (or (6)) cannot be expected to produce much of an increase in speed. In such a case, the methods (a) and (b) could be used to increase speed.

2. First Embodiment

Figure 3:
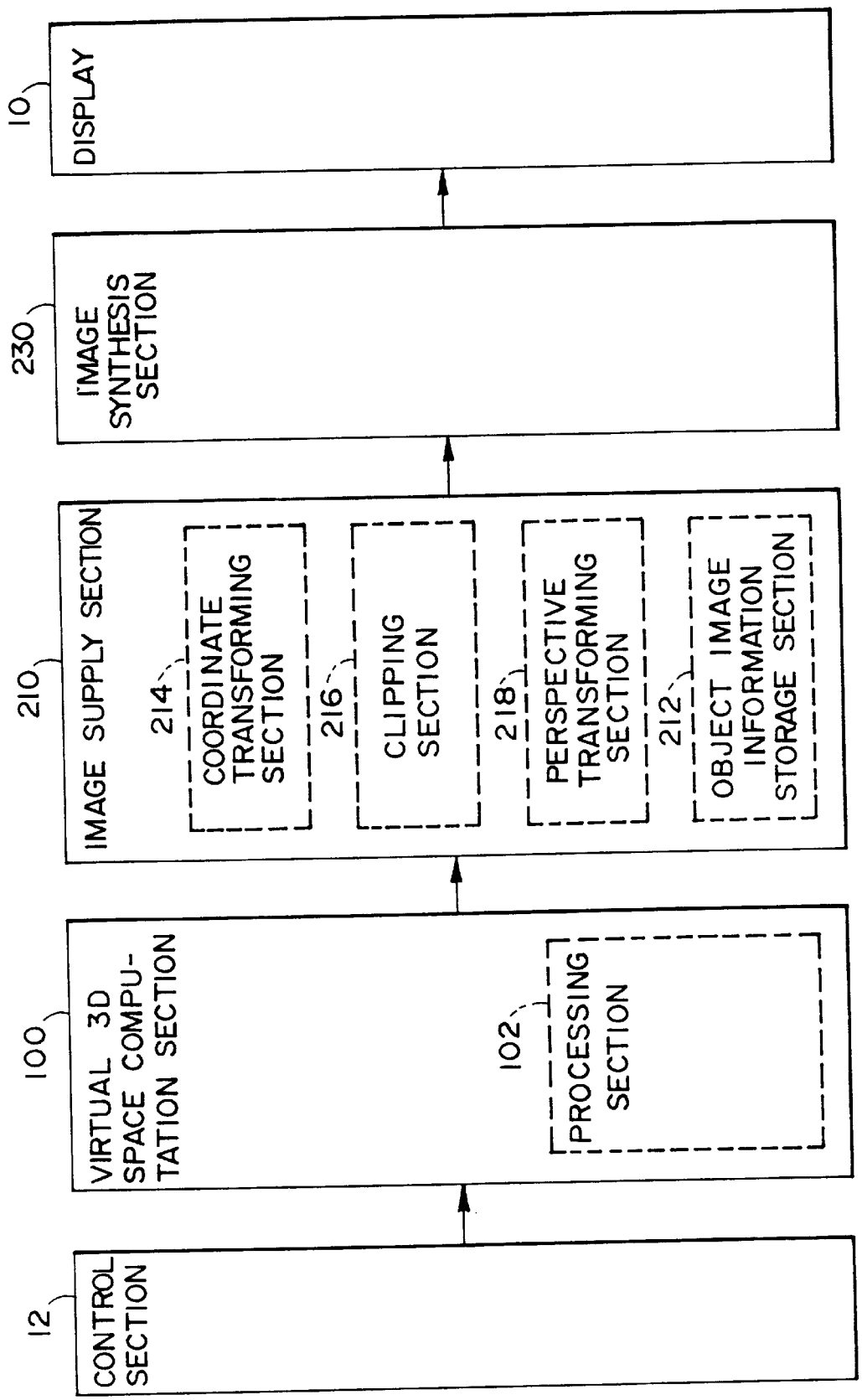
FIG. 3 is a block diagram of a first embodiment of this invention.
Figure 4:
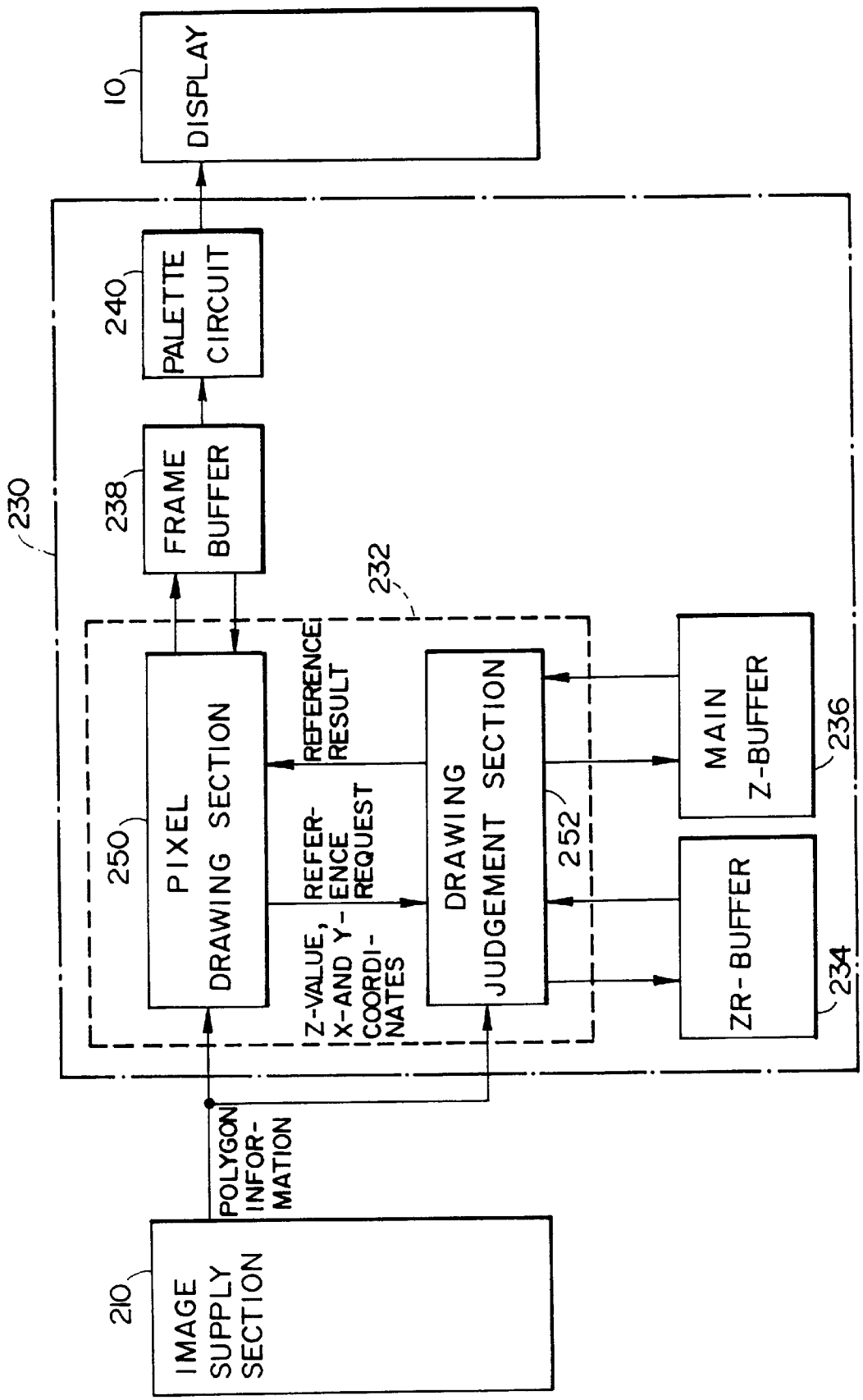
FIG. 4 is a block diagram showing details of the image synthesis section of the first embodiment of this invention.

Block diagrams of the configuration of a first embodiment of this invention are shown in FIGS. 3 and 4. This first embodiment comprises a control section 12, a virtual 3D space computation section 100, an image supply section 210, an image synthesis section 230, and a display 10. The image synthesis section 230 comprises a drawing processing section 232, a ZR-buffer 234, a main Z-buffer 236, a frame buffer 238, and a palette circuit 240, as shown in FIG. 4.

If this embodiment of the present invention is applied to a racing-car game, for example, the control section 12 comprises controls such as a steering wheel and accelerator pedal for operating the racing car, and control information is input to the system through these controls.

The virtual 3D space computation section 100 performs computations for setting details such as the position and orientation of a plurality of display objects within the virtual 3D space, such as racing cars, the track, and buildings. These computations are based on data such as control information from the control section 12, a games program stored in a processing section 102, and map information that has been set and stored beforehand.

Figure 5:
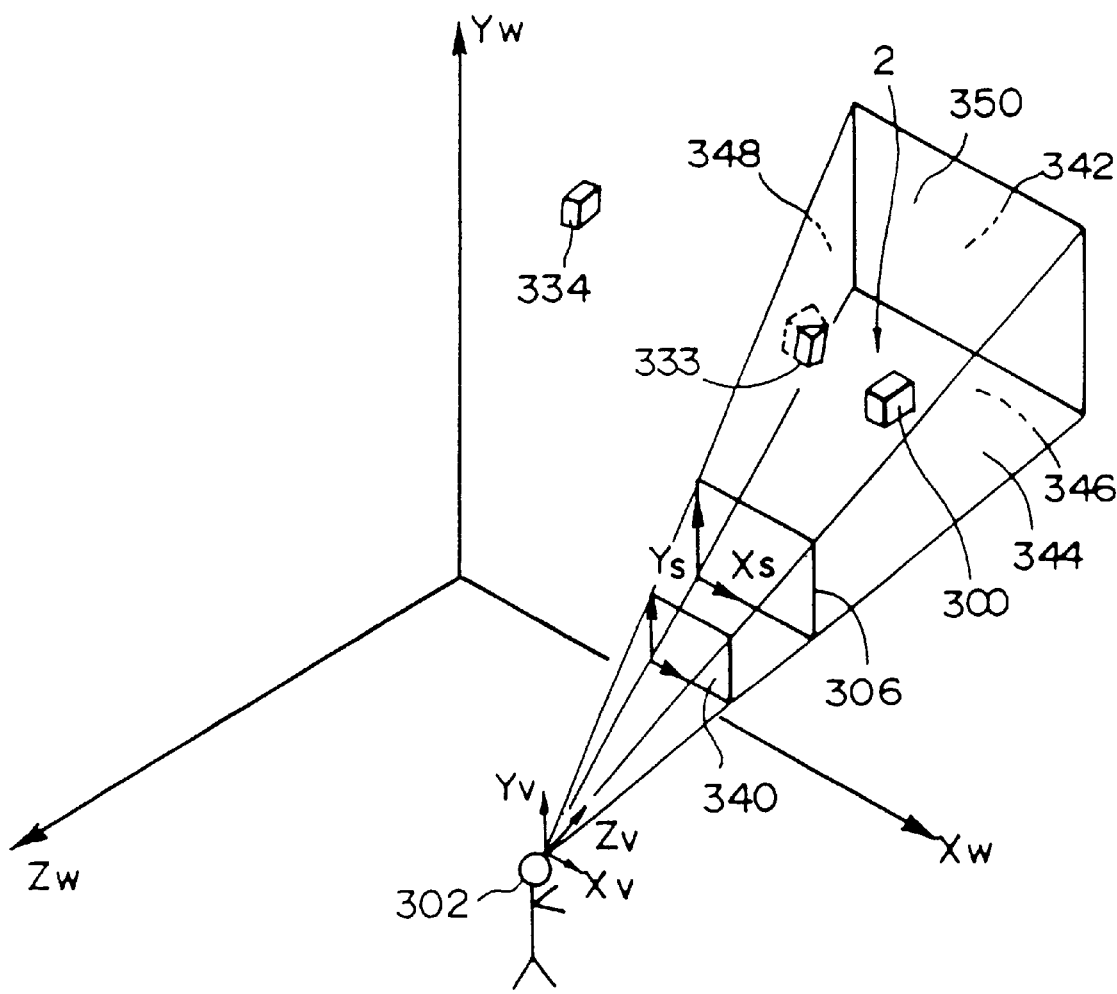
FIG. 5 is a view illustrating the 3D computation performed by the first embodiment.

The image supply section 210 performs various 3D computations in accordance with the position and orientation information of the display objects that is set by the virtual 3D space computation section 100 and object image information that is read out from an object image information storage section 212. First of all, computations are performed for objects 300, 333, and 334 that depict elements such as a racing car and the track, to place the polygons that configure these objects in a virtual 3D space expressed in a world coordinate system (absolute coordinate system) (XW, YW, ZW), as shown in FIG. 5. The coordinates of the polygons configuring each of these objects are then transformed by a coordinate transforming section 214 into viewpoint coordinates (Xv, Yv, Zv) referenced to the viewpoint of a player 302 or the like. Clipping is then performed by a clipping section 216, followed by perspective transformation by a perspective transforming section 218 into screen coordinate system (XS, YS).

Processing for drawing all of the pixels within each polygon is performed by the image synthesis section 230 of FIG. 4 from polygon information (information such as the vertex coordinates, vertex texture coordinates, and vertex brightness information of that polygon) and attribute information (information that is common within the polygon) obtained by the image supply section 210. This drawing processing is done by a drawing processing section 232 that comprises a pixel drawing section 250 and a drawing judgement section 252. Data such as color information and brightness information from the drawing processing section 232 is stored in the frame buffer 238, and is output to the display 10 through the palette circuit 240. Note that, if a texture mapping method is employed, it will be necessary to provide a separate texture information storage means either between the drawing processing section 232 and the frame buffer 238 or between the frame buffer 238 and the palette circuit 240.

Figure 6:
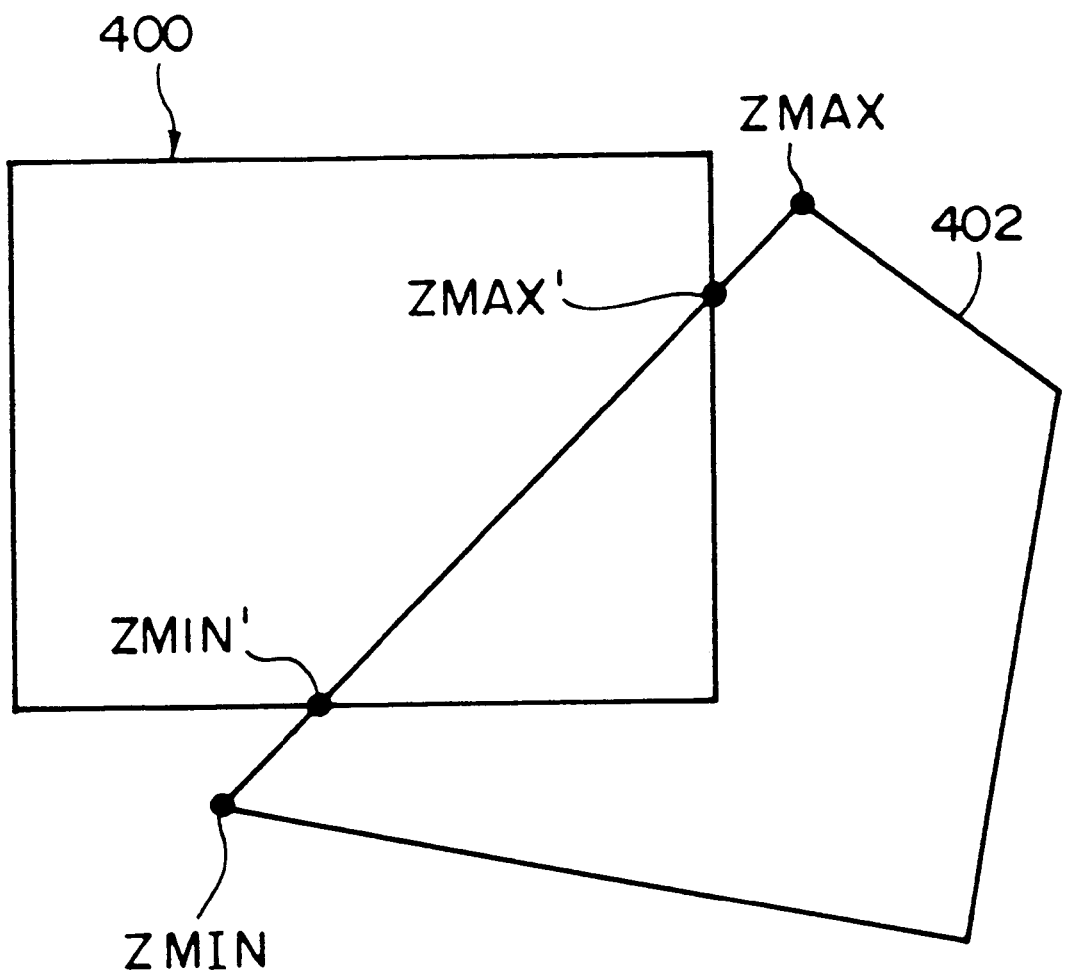
FIG. 6 is a view illustrating how the minimum and maximum values of the Z-value of a polygon are determined.

The operation of this embodiment will now be described. First of all, data such as polygon information from the image supply section 210 is input simultaneously to both the pixel drawing section 250 and the drawing judgement section 252. On the basis of this polygon information, the pixel drawing section 250 determines which pixels are to be drawn, outputs the Z-values of these pixels and X- and Y-coordinates that express the location of each of these pixels to the drawing judgement section 252, and requests referencing (read-out and comparison). At this point, the drawing judgement section 252 has already determined which of the ZR-buffer 234 or the main Z-buffer 236 is required, on the basis of the polygon information that is input from the image supply section 210. This means that the reference result has already been prepared to be returned to the pixel drawing section 250, to correspond to the reference request from the pixel drawing section 250. In other words, the drawing judgement section 252 had already obtained ZMIN and ZMAX, read ZMINR and ZMAXR from the ZR-buffer 234, and compared ZMIN with ZMAXR and ZMAX with ZMINR, at the stage at which the polygon information was input. Note that, in this case, the values of ZMIN and ZMAX could be used as the minimum and maximum Z-values of the polygon 402, ignoring the positional relationship between the polygon 402 and a block region 400, as shown in FIG. 6. Alternatively, the positional relationship between the polygon 402 and the block region 400 could be considered and the values of ZMIN' and ZMAX' of the part of the polygon 402 that is subdivided along the border lines of the block region 400 could be used instead.

If it has been determined by the process of referencing the ZR-buffer 234 that it is necessary to reference Z-values in the main Z-buffer 236, the drawing judgement section 252 will have already read the Z-values from the main Z-buffer 236 at this point.

The above procedure need only output Z-values and X- and Y-coordinates to the drawing judgement section 252 and issue a reference request; it is not necessary for an awareness of whether or not the reference processing of the drawing judgement section 252 has ended. When comparison of the Z-values has already been enabled by the drawing judgement section 252, in other words, when it is determined by referencing the ZR-buffer 234 that drawing processing is not necessary, and when the necessary Z-values have been read out of the main Z-buffer 236, the pixel drawing section 250 can immediately obtain the reference results. This enables the writing of image information to the frame buffer 238, making it possible to increase the processing speed.

If, on the other hand, comparison of the Z-values is not yet enabled at the drawing judgement section 252, the drawing judgement section 252 makes the pixel drawing section 250 wait. This does slow down the processing, but it guarantees accurate operation.

Note that it is not absolutely necessary for polygon information to be input to the drawing judgement section 252, but ensuring that polygon information has already been input when a reference request is input will increase the speed at which the reference result is returned. Note also that the configuration of FIG. 4, in which the pixel drawing section 250 and the drawing judgement section 252 are separate, has an advantage in that there is no need to modify the configuration of the pixel drawing section 250 if the factors such as the capacities of the ZR-buffer 234 and the main Z-buffer 236 or the access timing should change.

Figure 7:
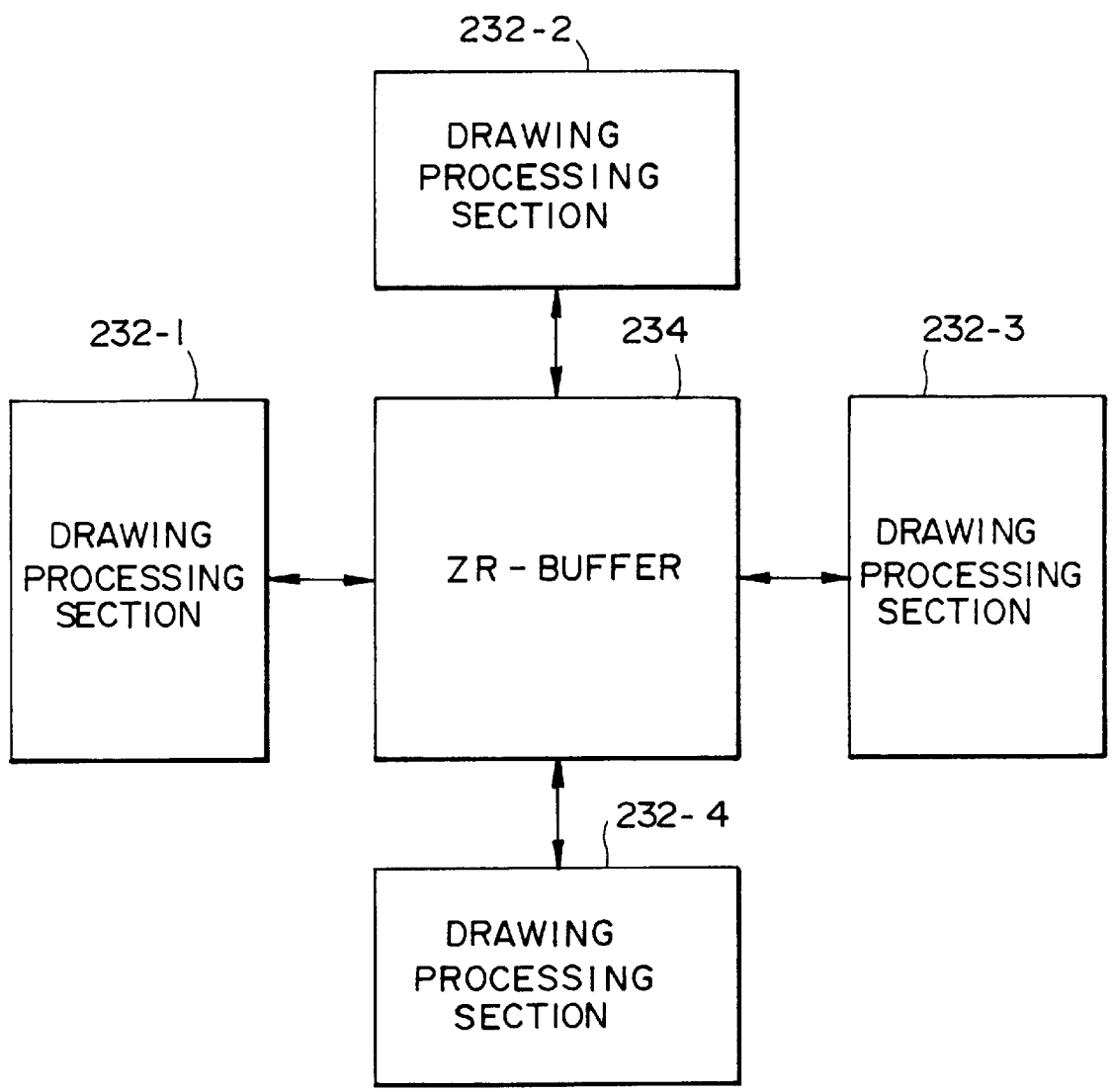
FIG. 7 shows an example of a configuration in which the ZR-buffer has a large number of ports, enabling parallel processing.

Since the main Z-buffer 236 of this embodiment must have a large capacity, it is provided as external memory outside the device configured of the drawing processing section 232 and other components. The ZR-buffer 234, on the other hand, need only have a small capacity so it can be incorporated within the device. Thus the ZR-buffer 234 can be accessed rapidly and, since it is not necessary to access the main Z-buffer 236 in all cases, the processing can be made much faster than that with the prior-art Z-buffer method. If the ZR-buffer 234 can be incorporated within the device, there would be none of the above described physical limitations on the number of pins, and thus a large number of input/output ports can be provided for the ZR-buffer 234, enabling a configuration in which drawing processing sections 232-1 to 232-4 are connected to these ports, as shown in FIG. 7. This makes it possible for drawing processing sections to operate in parallel, which in itself enables an increase in speed.

3. Second Embodiment

Figure 8:
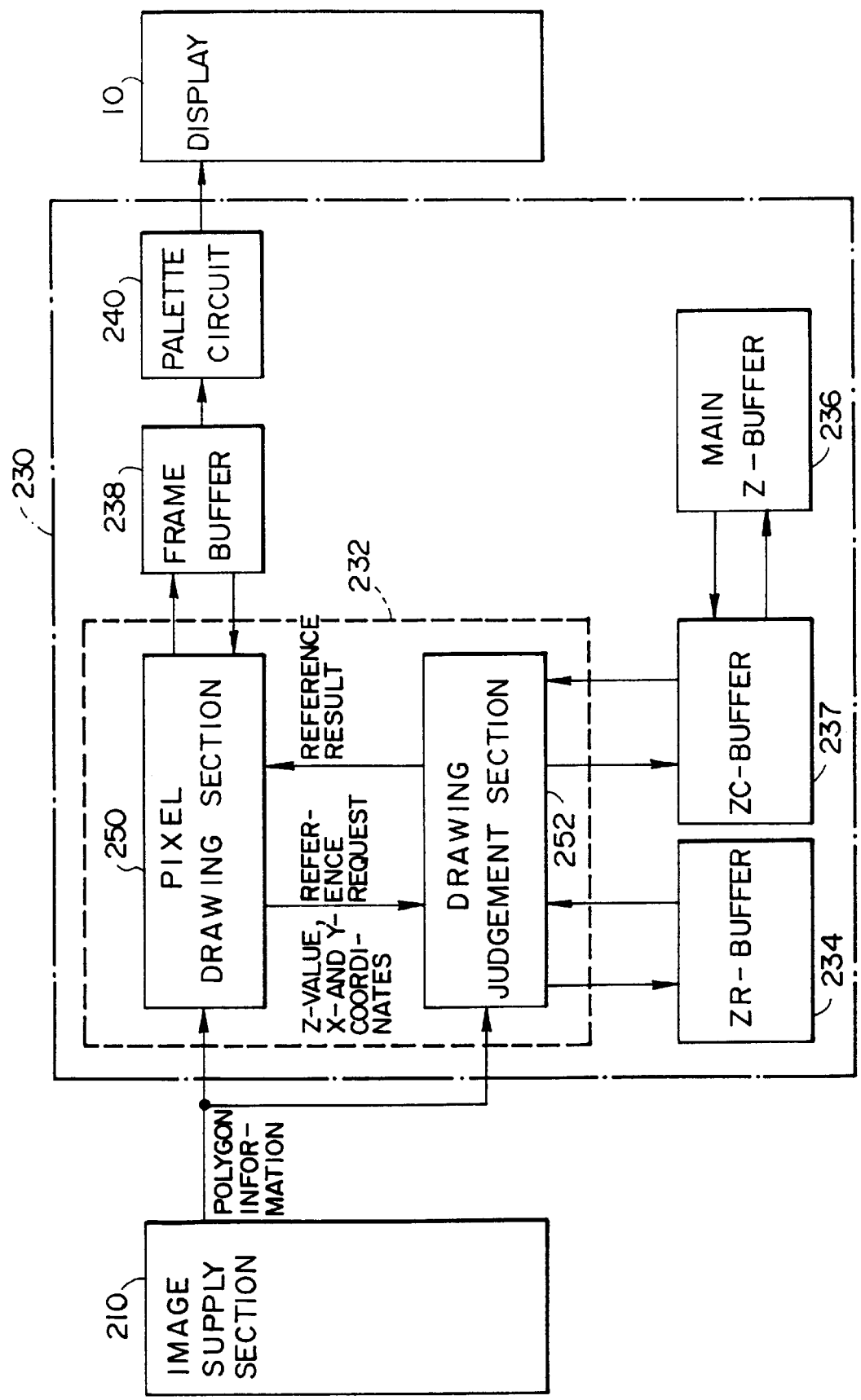
FIG. 8 is a block diagram of a second embodiment of this invention.

A black diagram of a second embodiment of this invention is shown in FIG. 8. This embodiment differs from the first embodiment in that it is further provided with a ZC-buffer 237 that acts as cache memory. This ZC-buffer 237 is sufficient to contain at least one region (block) of depth information, but preferably a plurality of regions of depth information, from the main Z-buffer 236. When the above condition (3) (or (6)) applies, in other words when it is necessary to reference depth information stored in the main Z-buffer 236, the drawing judgement section 252 first references the ZC-buffer 237. If the depth information to be referenced is in the ZC-buffer 237, that depth information is read from the ZC-buffer 237; if the depth information to be referenced is not in the ZC-buffer 237, the main Z-buffer 236 is accessed for the first time.

Since the ZC-buffer 237 need have only a small capacity, it can be incorporated into the device performing the drawing and other processing. Thus access to the ZC-buffer 237 can be made faster than access to the main Z-buffer 236, making it possible to suppress any drop in the processing speed when condition (3) (or (6)) applies. Since the ZC-buffer 237 can be incorporated within the device, the ZC-buffer 237 can be provided with a large number of ports in the same manner as that shown in FIG. 7, and thus the process of referencing the ZC-buffer 237 can be done in parallel by connecting the plurality of drawing processing sections 232-1 to 232-4 thereto.

The depth information for at least one region is stored in the ZC-buffer 237. Therefore, if it has been determined that condition (3) (or (6)) applies, based on the polygon information and the values of ZMINR and ZMAXR stored in the ZR-buffer 234, the drawing judgement section 252 need only reference the depth information in the ZC-buffer 237. This makes it possible to simplify and accelerate the processing. The configuration of this embodiment, in which depth information corresponding to at least one region of information in the ZR-buffer 234 is stored in the ZC-buffer 237 has more advantages than a simple combination with memory having a cache function.

4. Third Embodiment

A third embodiment of this invention makes use of the page mode function of memory such as DRAM, to increase speed. Consider a case in which the main Z-buffer 236 is divided into M×N regions each consisting of 4×4=16 pixels, as shown in FIG. 9A. In this case, if the contents of the main Z-buffer 236 were to be stored in memory such as DRAM with no particular planning, the data (depth information) would be stored in an address array as shown in FIG. 9B. If depth information for a region a is to be read out from depth information that is stored with this address array, it would be necessary to increment the row address sequentially to select the first row address to read out data items a1 to a4, then select the second row address to read out data items a5 to a8, and so on. This obstructs the acceleration of reading from and writing to memory. This third embodiment of the invention stores the depth information in such a manner that, for example, all of the depth information for region a is stored at a single first row address in the main Z-buffer 236, the depth information for a region b is stored at a second row address, and the depth information for a region c is stored at a third row address, as shown in FIG. 9C. Of course, depth information for a plurality of regions could be stored at the first row address (for instance, the depth information for regions a, b, and c could all be stored at the first row address).

The main Z-buffer 236 of this third embodiment is configured of memory such as DRAM that has a page mode function. In this page mode, the column address changes in synchronization with a column address strobe (CAS) signal and the row address changes in synchronization with a row address strobe (RAS) signal, as shown in FIG. 9D. Therefore, data belonging to the same row address can be read and written at high speed, simply by switching the CAS signal. In this embodiment, the depth information for at least one region is stored at one row address. Therefore, while the depth information for one region is being referenced, this depth information can be read and written by simply controlling the CAS signal, so that the depth information can be read and written at high speed. The control of this CAS signal is done by the drawing judgement section 252.

In this manner, the configuration of this embodiment which stores depth information corresponding to at least one region of data in the ZR-buffer 234 as data at a single row address in the main Z-buffer 236 and also makes use of the speed of page mode has more advantages than a simple combination with memory having a page mode function.

It should be noted that this invention is not limited by the above described first to third embodiments; it can be modified in various different manners within the scope of the claims thereof.

For example, the description of the above embodiments mainly concerned drawing processing that was performed for individual polygons, but the present invention is not limited thereto; it can equally well be applied to processing of individual pixels using a scan-line algorithm, irrespective of any polygons.

Figure 10A:
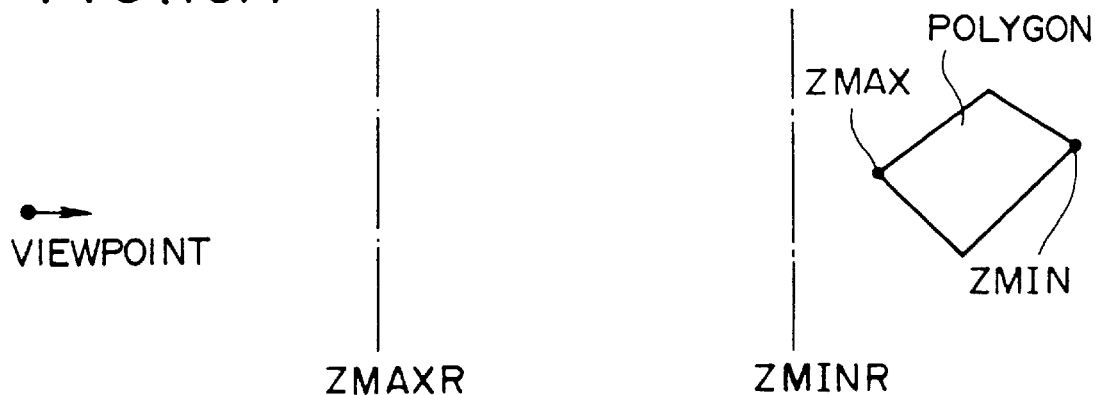
FIGS. 10A to 10C show the relationships between ZMIN, ZMAX, ZMINR, and ZMAXR when depth information decreases with increasing distance from the viewpoint.
Figure 10B:
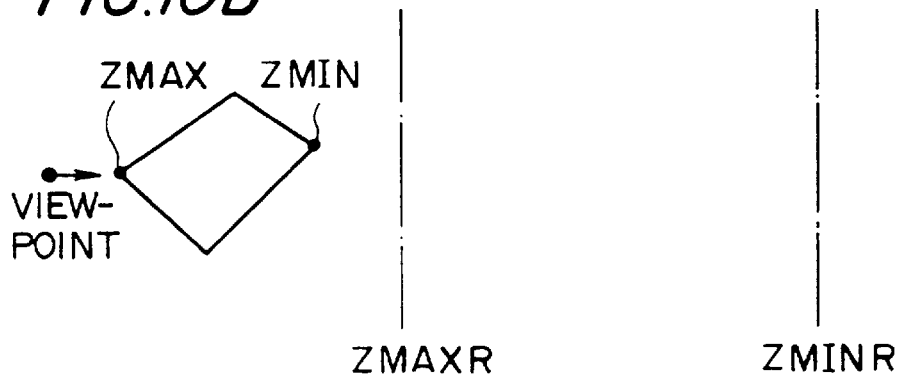
Figure 10C:
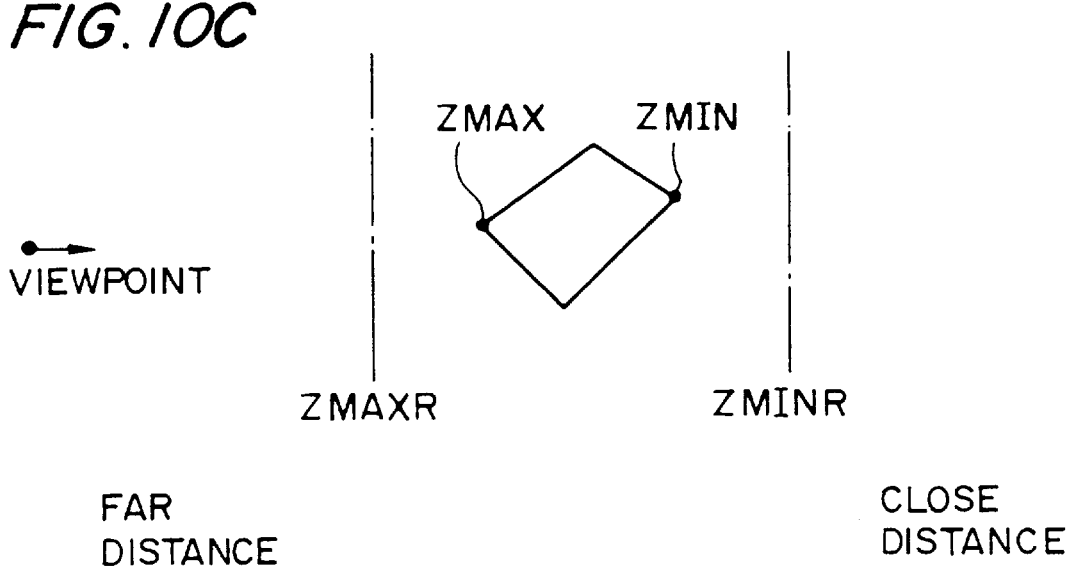
Figure 11:
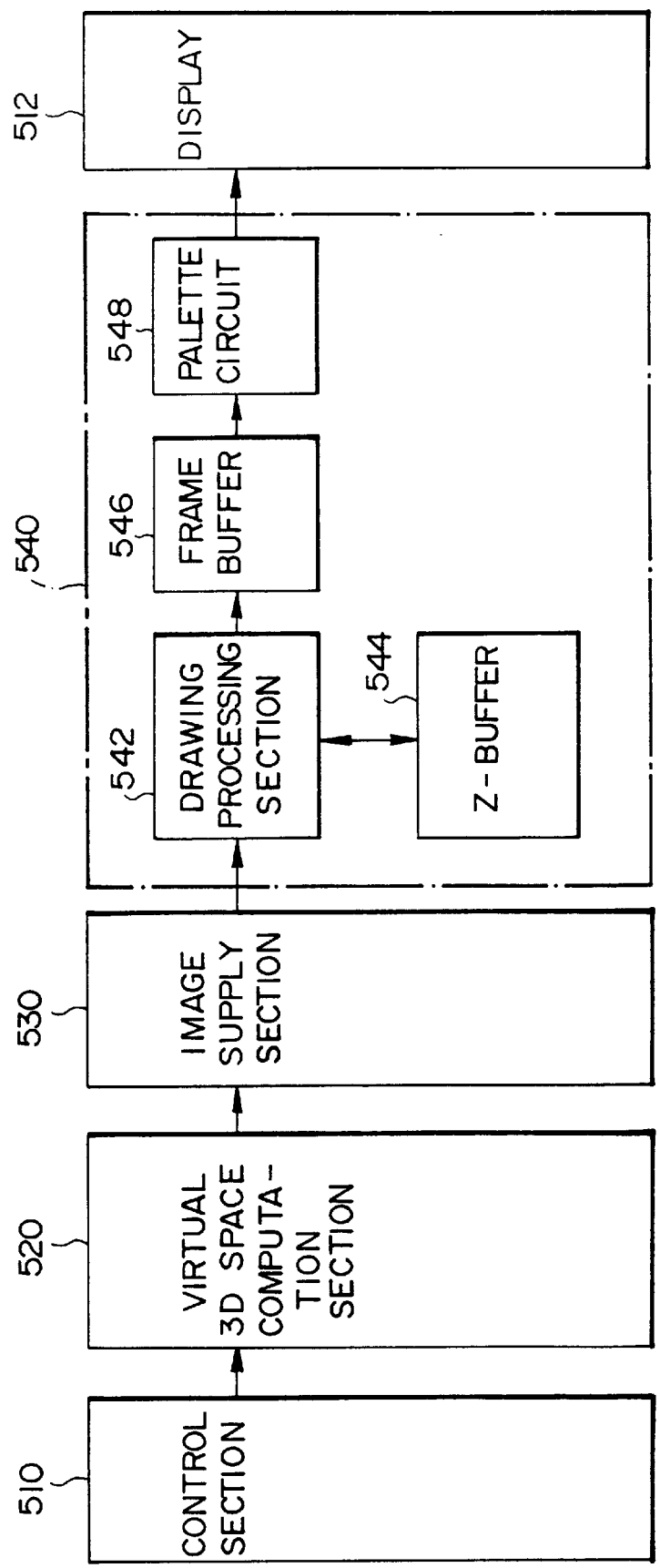
FIG. 11 is a block diagram of an example of a prior-art configuration.
Figure 12A:
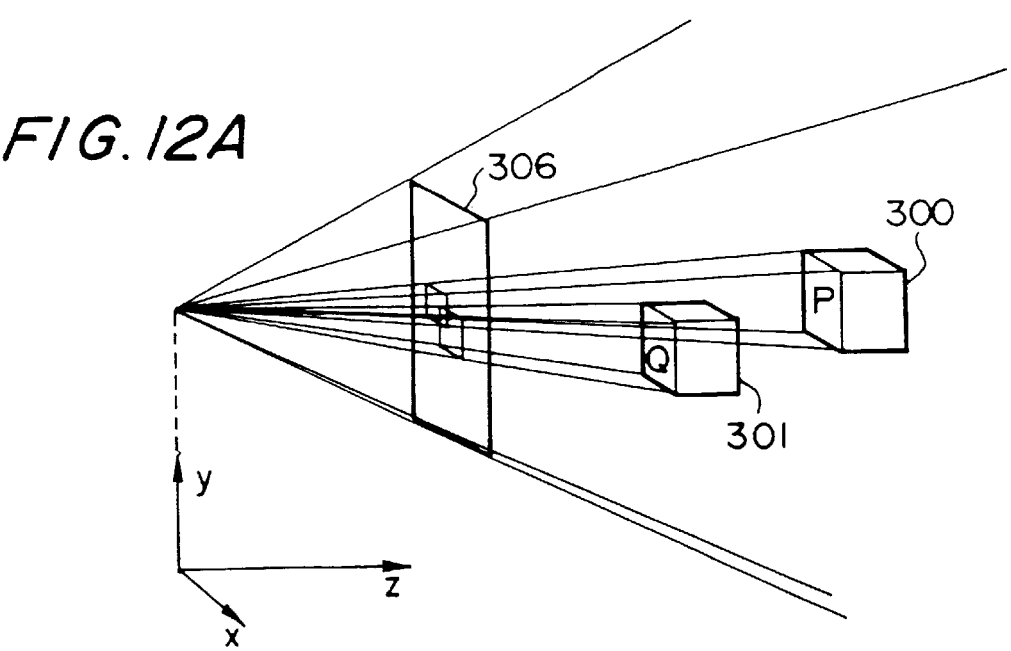
FIGS. 12A and 12B are diagrams illustrative of the Z-buffer method.
Figure 12B:
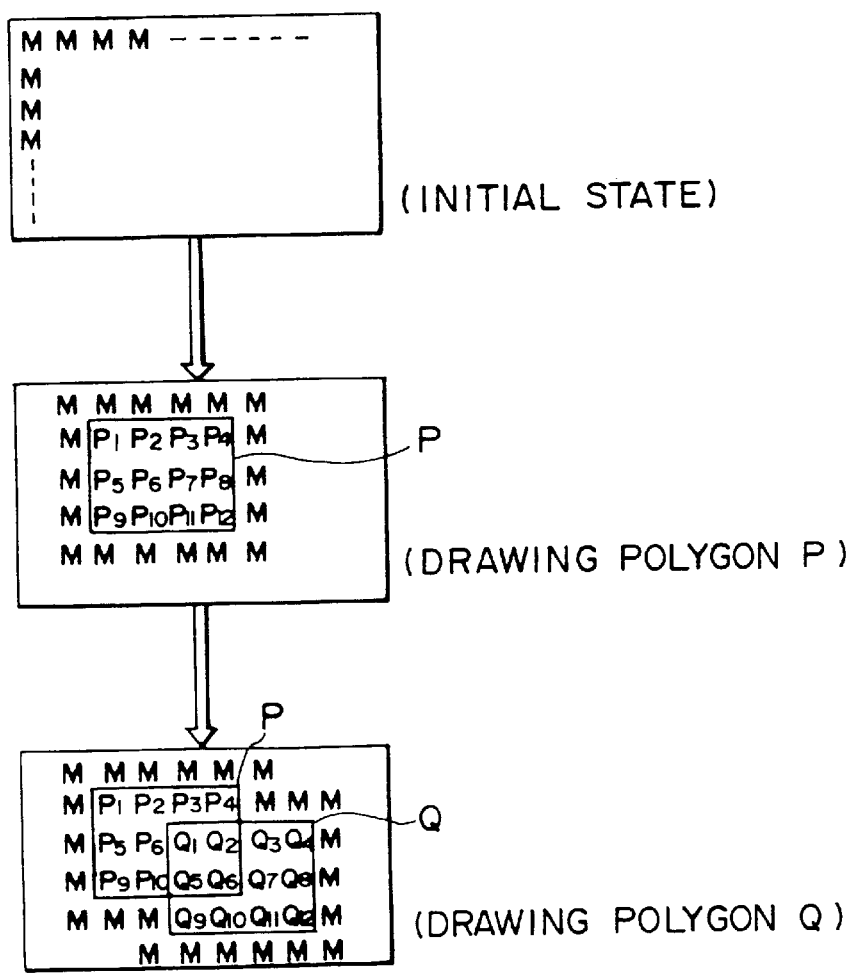

Similarly, the description of the above embodiments concerned depth information that increased with increasing distance from the viewpoint, but the range of this invention can naturally be applied to a case in which depth information decreases with increasing distance from the viewpoint. The relationships between ZMIN, ZMAX, ZMINR, and ZMAXR in such a case are shown in FIGS. 10A to 10C. In this case, the above conditions (1), (2), (4), and (5) would be modified as follows:
(1)'When ZMAX≦ZMINR (or ZMAX<ZMINR);
(2)'When ZMIN≧ZMAXR (or ZMIN>ZMAXR);
(4)'When ZPIX<ZMINR (or ZPIX<ZMINR);
(5)'When ZPIX≧ZMAXR (or ZPIX>ZMAXR).

Note that the configurations of the drawing processing section and the image synthesis section, as well as the overall configuration of the image synthesis apparatus itself, are not limited to those described above in the embodiments, and thus various different configurations can be employed therefor.

The image synthesis apparatus and image synthesis method of this invention can be applied to various different purposes, such as an arcade games machine, a domestic games machine, a flight simulator, or a driving simulator as used in a driving school. The principle of this invention is particularly suitable for the algorithms of games programs stored in a games cartridge, a CD-ROM, or a floppy disk used in a domestic games machine or personal computer. It can also be applied to a large-scale attraction type of game device or simulator in which a number of players participate.

If this invention is adapted for a games machine, it can be applied to various different kinds of games machines, such as those for racing-car games, combat games, role-playing games, or spaceship games in which a 3D map is created.

The computations performed by the image synthesis section and drawing processing section in accordance with this invention could equally well be performed by a dedicated image synthesis section, drawing processing section, a general-purpose microprocessor, or by software means using a DSP.

I claim:
1. An image synthesis apparatus for referencing depth information from a main Z-buffer which stores depth information that expresses distance from a viewpoint for each of pixels on a display screen and for drawing a display object configured by polygons, comprising:

a ZR-bluffer for storing a minimum value ZMINR and a maximum value ZMAXR of depth information for the pixels within each region of said main Z-buffer, where said main Z-buffer is divided into M×N regions each formed of K×L pixels; and drawing processing means for omitting a process of referencing depth information stored within said main Z-buffer and a process of drawing a polygon when ZMIN≧ZMAXR or ZMIN>ZMAXR, where a minimum value or a value less than said minimum value of depth information for pixels within said polygon is ZMIN and a maximum value or a value greater than said maximum value thereof is ZMAX, and for performing the process of drawing said polygon without referencing depth information stored within said main Z-buffer when ZMAX≦ZMINR or ZMAX<ZMINR;

said drawing processing means comprising pixel drawing means and drawing judgment means;

said pixel drawing means receiving polygon information that includes vertex coordinates of the polygon, drawing the pixels inside the polygon, and outputting reference requests to said drawing judgment means; and said drawing judgment means receiving said polygon information, obtaining ZMIN and ZMAX of the polygon based on said polygon information, determining a region to which the polygon belongs based on said polygon information, reading ZMINR and ZMAXR of the determined region from the ZR-buffer, comparing ZMIN with ZMAXR and ZMAX with ZMINR, and outputting reference results corresponding to said reference requests to said pixel drawing means.

2. The image synthesis apparatus as defined in claim 1; wherein:

a minimum value or a value less than said minimum value of depth information of pixels within a part of a polygon which is subdivided along border lines of said regions is set to be said ZMIN, and a maximum value or a value greater than said maximum value thereof is set to be said ZMAX.

3. The image synthesis apparatus as defined in claim 1; further comprising:

a ZC-buffer for storing depth information for at least one of said regions of said main Z-buffer, said ZC-buffer being a cache memory of the main Z-buffer; and wherein:

when depth information for the region to which the polygon belongs is already stored in said ZC-buffer, said drawing processing means performs the process of drawing by referencing depth information stored in said ZC-buffer, without referencing depth information stored in said main Z-buffer.

4. The image synthesis apparatus as defined in claim 2; further comprising:

a ZC-buffer for storing depth information for at least one of said regions of said main Z-buffer, said ZC-buffer being a cache memory of the main Z-buffer; and wherein:

when depth information for the region to which the polygon belongs is already stored in said ZC-buffer, said drawing processing means performs the process of drawing by referencing depth information stored in said ZC-buffer, without referencing depth information stored in said main Z-buffer.

5. The image synthesis apparatus as defined in claim 1; wherein:

said main Z-buffer is configured of memory wherein a column address changes in synchronization with a column address strobe (CAS) signal and a row address changes in synchronization with a row address strobe (RAS) signal; and depth information for at least one of said regions is stored in said memory as data at one row address;

said drawing processing means reading depth information for the region to which the polygon belongs from said main Z-buffer by only controlling said CAS signal.

6. The image synthesis apparatus as defined in claim 2; wherein:

said main Z-buffer is configured of memory wherein a column address changes in synchronization with a column address strobe (CAS) signal and a row address changes in synchronization with a row address strobe (RAS) signal; and depth information for at least one of said regions is stored in said memory as data at one row address;

said drawing processing means reading depth information for the region to which the polygon belongs from said main Z-buffer by only controlling said CAS signal.

7. The image synthesis apparatus as defined in claim 1; wherein:

when depth information is set to decrease with increasing distance from said viewpoint, said drawing processing means omits the process of referencing depth information stored in said main Z-buffer and the process of drawing when ZMAX≦ZMINR or ZMAX<ZMINR, or when ZPIX≦ZMINR or ZPIX<ZMINR, and performs the process of drawing without referencing depth information stored in said main Z-buffer when ZMIN≧ZMAXR or ZMIN>ZMAXR, or when ZPIX≧ZMAXR or ZPIX>ZMAXR.

8. The image synthesis apparatus as defined in claim 2; wherein:

when depth information is set to decrease with increasing distance from said viewpoint, said drawing processing means omits the process of referencing depth information stored in said main Z-buffer and the process of drawing when ZMAX≦ZMINR or ZMAX<ZMINR, or when ZPIX≦ZMINR or ZPIX<ZMINR, and performs the process of drawing without referencing depth information stored in said main Z-buffer when ZMIN≧ZMAXR or ZMIN>ZMAXR, or when ZPIX≧ZMAXR or ZPIX>ZMAXR.

9. The image synthesis apparatus as defined in claim 3; wherein:

when depth information is set to decrease with increasing distance from said viewpoint, said drawing processing means omits the process of referencing depth information stored in said main Z-buffer and the process of drawing when ZMAX≦ZMINR or ZMAX<ZMINR, or when ZPIX≦ZMINR or ZPIX<ZMINR, and performs the process of drawing without referencing depth information stored in said main Z-buffer when ZMIN≧ZMAXR or ZMIN>ZMAXR, or when ZPIX≧ZMAXR or ZPIX>ZMAXR.

10. The image synthesis apparatus as defined in claim 5; wherein:

when depth information is set to decrease with increasing distance from said viewpoint, said drawing processing means omits the process of referencing depth information stored in said main Z-buffer and the process of drawing when ZMAX≦ZMINR or ZMAX<ZMINR, or when ZPIX≦ZMINR or ZPIX<ZMINR, and performs the process of drawing without referencing depth information stored in said main Z-buffer when ZMIN≧ZMAXR or ZMIN>ZMAXR, or when ZPIX≧ZMAXR or ZPIX>ZMAXR.

* * * * *